US012661998B2

(12) United States Patent
Möller et al.

(10) Patent No.: US 12,661,998 B2
(45) Date of Patent: Jun. 23, 2026

(54) METHOD OF CONTROLLING A HEAVY-DUTY VEHICLE

(71) Applicant: Volvo Truck Corporation, Gothenburg (SE)

(72) Inventors: Daniel Möller, Gothenburg (SE); Johan Hansson, Gothenburg (SE); Leo Laine, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 79 days.

(21) Appl. No.: 18/862,744

(22) PCT Filed: May 25, 2022

(86) PCT No.: PCT/EP2022/064258
§ 371 (c)(1),
(2) Date: Nov. 4, 2024

(87) PCT Pub. No.: WO2023/227215
PCT Pub. Date: Nov. 30, 2023

(65) Prior Publication Data
US 2025/0282229 A1     Sep. 11, 2025

(51) Int. Cl.
B60L 7/26          (2006.01)
B60Q 9/00          (2006.01)

(52) U.S. Cl.
CPC .................. B60L 7/26 (2013.01); B60Q 9/00 (2013.01); *B60L 2200/36* (2013.01);
(Continued)

(58) Field of Classification Search
CPC .... B60L 7/26; B60L 2200/36; B60L 2240/26; B60L 2240/46; B60L 2240/465;
(Continued)

(56) References Cited

U.S. PATENT DOCUMENTS

2010/0168977 A1*   7/2010   Matsuno .......... B60W 50/0098
                                                                701/74
2011/0106388 A1     5/2011   Boeckenhoff et al.
(Continued)

FOREIGN PATENT DOCUMENTS

EP          3795435 A1     3/2021

OTHER PUBLICATIONS

International Search Report and Written Opinion for International Patent Application No. PCT/EP2022/064258, mailed Apr. 5, 2023, 14 pages.
(Continued)

*Primary Examiner* — Michael C Zarroli
(74) *Attorney, Agent, or Firm* — Withrow & Terranova, PLLC

(57)          ABSTRACT

A method of controlling a heavy-duty vehicle, comprising an electric machine configured to apply a propulsion torque on at least one wheel of the vehicle upon applying a pressure on an accelerator pedal of the vehicle, and to apply a brake torque on the at least one wheel upon releasing the pressure from the accelerator pedal, the method comprising determining a lateral force on the at least one wheel of the vehicle; determining a maximum allowable lateral force of the at least one wheel for obtaining a desired longitudinal brake force by the electric machine when releasing the pressure from the accelerator pedal; and transmitting a signal indicative of a foundation braking interaction to an operator of the vehicle when the lateral force is higher than the maximum allowable lateral force.

15 Claims, 5 Drawing Sheets

(52) U.S. Cl.
CPC ....... *B60L 2240/26* (2013.01); *B60L 2240/46*
(2013.01); *B60L 2240/465* (2013.01); *B60L*
*2240/642* (2013.01); *B60L 2240/647*
(2013.01); *B60L 2250/10* (2013.01); *B60L*
*2250/16* (2013.01); *B60L 2250/26* (2013.01)

(58) Field of Classification Search
CPC ......... B60L 2240/642; B60L 2240/647; B60L
2250/10; B60L 2250/16; B60L 2250/26;
B60L 2200/40; B60L 2240/12; B60L
2240/16; B60L 2240/18; B60L 3/08;
B60L 2240/14; B60L 7/18; B60Q 9/00;
Y02T 10/72
See application file for complete search history.

(56)                  References Cited

U.S. PATENT DOCUMENTS

| | | | |
|---|---|---|---|
| 2013/0173132 A1* | 7/2013 | Yuasa | B60W 30/0956 |
| | | | 701/70 |
| 2015/0291038 A1 | 10/2015 | Akiyama et al. | |
| 2018/0056987 A1* | 3/2018 | Suzuki | B60W 40/1005 |
| 2022/0063626 A1* | 3/2022 | Kaneko | B60L 7/16 |
| 2022/0080942 A1 | 3/2022 | Eberl | |
| 2022/0097707 A1 | 3/2022 | Semenov et al. | |
| 2023/0027431 A1* | 1/2023 | Kaneko | B60L 15/2009 |

OTHER PUBLICATIONS

Written Opinion for International Patent Application No. PCT/
EP2022/064258, mailed Mar. 6, 2024, 6 pages.
International Preliminary Report on Patentability for International
Patent Application No. PCT/EP2022/064258, mailed Mar. 28, 2024,
36 pages.

* cited by examiner

METHOD OF CONTROLLING A HEAVY-DUTY VEHICLE

This application is a 35 USC 371 national phase filing of International Application No. PCT/EP2022/064258, filed May 25, 2022, the disclosure of which is incorporated herein by reference in its entirety.

TECHNICAL FIELD

The present invention relates to a method of controlling a heavy-duty vehicle. In particular, the invention relates to controlling the heavy-duty vehicle to transmit a signal to an operator when lateral forces on a wheel operably controlled by an electric machine exceeds a maximum allowable lateral force during braking. The invention also relates to a vehicle motion management system. Although the invention will mainly be directed to a heavy-duty vehicle in the form of a truck, the invention may also be applicable for other types of vehicles comprising one or more electric machines for generating propulsion power, such as e.g., buses, working machines, trailers, and other transportation vehicles.

BACKGROUND

Electrified propulsion of passenger cars is becoming a conventional solution to reduce the environmental effect caused by vehicles. Heavy-duty vehicles, such as trucks, are also continuously developed to be able to provide electrified propulsion. The electrified propulsion system comprises one or more electric machines operable to generate a propulsion torque on one or more wheels of the vehicle. However, a truck is heavy and the need for relatively large batteries is required to enable for an acceptable distance capacity until having to re-charge the battery.

For re-charging the batteries during operation, the electric machines are configured to generate electric power during braking. In this situation, electric power generated by the electric machine is fed to the battery to charge the battery, so-called regenerative braking. Hereby, the distance until having to re-charge the batteries can be extended.

One approach to increase the number of occasions to operate the vehicle to perform regenerative braking is to use a so-called one pedal speed control. In a one pedal speed control system, the electric machine applies a propulsion torque on a wheel of the vehicle when the operator applies a pressure on the accelerator pedal and applies a brake torque generating electric power upon releasing the pressure from the accelerator pedal. Hence, the accelerator pedal is used both for propulsion as well as for braking and the battery is charged every time the operator releases the pressure from the accelerator pedal.

However, situations may arise when the brake torque caused by releasing the pressure from the accelerator pedal is not sufficient to reduce the vehicle speed as desired. In such situation, interaction of the foundation brakes could be necessary to properly reduce the vehicle speed. The operator might however not react rapidly enough to such situation and there is thus a desire to further increase the safety during braking of a heavy-duty vehicle.

According to its abstract, US 2015/291038 relates to a vehicle control device which can calculate a slip ratio in which front and rear wheels are averaged, and a braking force in which the front and rear wheels are averaged. The vehicle control device is provided with: friction braking devices placed on each wheel; a motor that acts as a regenerative braking mechanism and is placed on the rear wheels; a vehicle slip stiffness calculation unit; a front and rear braking force ratio calculation unit; a vehicle slip stiffness correction unit; and a regenerative braking arithmetic unit. The regenerative braking arithmetic unit operates the friction braking device and the motor so as to make the vehicle slip stiffness reach a vehicle slip stiffness threshold value. Also, the vehicle slip stiffness correction unit corrects the vehicle slip stiffness threshold value in accordance with the ratio of the front wheel braking force and the rear wheel braking force.

Further, US 2011/106388 describes in its abstract a torque management system and method by which the torque provided by an engine can be controlled based on a mass of the vehicle and, if available, instantaneous and/or predictive slope information. Also, in some modes of operation, torque can be controlled based on speed limit information for upcoming road segments to be traveled by a vehicle. In addition to controlling the maximum allowable torque, optionally the minimum allowable torque can also be controlled to prevent inadvertent decelerations of the vehicle. A driver/operator can optionally override the torque control and the history of override requests can optionally be used to adjust overrides of the system. A plurality of torque control approach sub-methods can be made available with the appropriate sub-mode being selected depending, for example, upon the extent of the available information.

Moreover, US 2022/080942 relates to a control unit for a motor vehicle which includes at least one electric machine for driving one or more wheels of the vehicle and at least one friction brake is provided. The control unit is configured to determine that a one-pedal feel function is to be provided via an acceleration pedal of the vehicle and/or a creep function is to be provided via a brake pedal of the vehicle. Additionally, the control unit is configured to operate the electric machine at least temporarily in combination with the friction brake in order to provide the one-pedal feel function and/or the creep function.

Finally, EP 3 795 435 relates to techniques for estimating road friction between a road and tires of a vehicle. A method includes receiving, from a temperature sensor on a vehicle, a temperature value that indicates a temperature of an environment in which a vehicle is operated, determining a first range of friction values that quantify a friction between a road and tires of a vehicle based on a function of the temperature value and an extent of precipitation in a region that indicate a hazardous driving condition, obtaining, from the first range of friction values, a value that quantifies the friction between the road and the tires of the vehicle, where the value is obtained based on a driving related behavior of the vehicle, and causing the vehicle to operate on the road based on the value obtained from the first range of friction values.

SUMMARY

It is thus an object of the present invention to at least partially overcome the above-described deficiencies.

According to a first aspect, there is provided a method of controlling a heavy-duty vehicle, the vehicle comprising an electric machine configured to apply a propulsion torque on at least one wheel of the vehicle upon applying a pressure on an accelerator pedal of the vehicle, and to apply a brake torque on the at least one wheel upon releasing the pressure from the accelerator pedal, the method comprising determining a lateral force on the at least one wheel of the vehicle; determining a maximum allowable lateral force of the at least one wheel for obtaining a desired longitudinal brake force by the electric machine when releasing the pressure from the accelerator pedal, the maximum allowable lateral force being based on a determined vertical wheel force of the at least one wheel, an estimated road friction between a tire surface of the at least one wheel and a road surface operable by the vehicle, and a detected inclination of the road surface; and transmitting a signal indicative of a foundation braking interaction to an operator of the vehicle when the lateral force is higher than the maximum allowable lateral force.

The present invention thus relates to a so-called one pedal speed control system in which the accelerator pedal is used both for propulsion as well as for braking, where braking is performed by using the electric machine to regenerate electric power upon releasing the pressure on the accelerator pedal. It should however be observed that the pressure need not be completely removed from the accelerator pedal to initiate regenerative braking. Rather, the electric machine generates electric power when the pressure on the accelerator pedal is slightly reduced, i.e. when the pressure on the accelerator pedal is lower compared to a previous instance in time when the operator accelerated or maintained a vehicle speed by applying a pressure. Put it differently, the pressure does not have to be fully released for the electric machine to apply a brake torque.

Moreover, and as described above, the friction is an estimated parameter. This estimation may come from e.g. a camera and/or an ambient temperature measurement, etc. Other friction estimation techniques are also conceivable and applicable by the skilled person. Furthermore, and according to an example embodiment, the maximum allowable lateral force may be further based on a total mass of the vehicle.

The present invention is based on the insight that during operation of a vehicle in a curvature road path, the wheels of the vehicle are exposed to a lateral wheel force. A larger lateral wheel force results in a lower available longitudinal brake force for the wheels of the vehicle during braking. Accordingly, if the lateral wheel force is too high, the electric machine may not, due to e.g. the friction condition between the tire surface of the wheel and the road surface, be able to apply a sufficient longitudinal brake force. An advantage of the present invention is therefore that in such situation, a signal indicative of a foundation brake interaction is transmitted to the operator of the vehicle. According to an example embodiment, the signal indicative of the foundation braking interaction may be transmitted to a human machine interface (HMI) of the vehicle. Hereby, the operator will be rapidly informed of the current or upcoming situation and apply the foundation brake(s) to further reduce the vehicle speed. As an alternative or complement, and according to an example embodiment, a brake system of the vehicle may be configured to receive the transmitted signal indicative of the foundation braking interaction and, in response thereto, control the at least one foundation brake to apply a brake torque upon receiving the signal.

According to an example embodiment, the method may further comprise determining a wheel slip value for the at least one wheel; and determining the lateral force exposed to the at least one wheel based on a mapping model defining a relationship between wheel slip and lateral wheel force.

The mapping model is preferably based on a predetermined characteristic value of the at least one wheel. The mapping model defines a relationship between wheel force and wheel slip. The wheel slip can also be recalculated to a wheel speed, where the wheel speed can be defined relative to the ground, and normalized, i.e. the wheel slip, or be defined as an absolute rotational velocity. Thus, when defining a mapping model, a lateral wheel force value for a specific wheel speed or wheel slip value can be obtained.

The mapping model can be a fixed mapping model, and/or a mapping model comprising estimated characteristics of the relationship between the wheel forces and the wheel slip values. As another alternative, the mapping model could be parameterized based on other factors, such as normal load on the tire, type of tire, wear, friction, etc.

By estimating the lateral wheel force based on the mapping model, a characteristic of the lateral wheel force can be properly estimated, i.e. the estimation can be reliably determined.

The lateral wheel force can alternatively be estimated by vehicle states and road conditions, or measured.

According to an example embodiment, the lateral force may be a current lateral force exposed to the at least one wheel of the vehicle. Hereby, the signal is transmitted when the vehicle is e.g. operated in a road curvature while the electric machine regenerates electric power during the one pedal brake operation.

According to an example embodiment, the electric machine may be operable to apply a brake torque on a pair of rear wheels of the vehicle. According to an example embodiment, the electric machine may be connected to the pair of rear wheels via differential coupling. One single electric machine is hereby propelling and breaking the rear pair of wheels.

According to an example embodiment, the road surface may be a road surface currently operated by the vehicle. As an alternative, and according to an example embodiment, the road surface may be a detected road surface ahead of the vehicle.

In the latter situation, the lateral force on the wheel is estimated by e.g. determining the upcoming curvature of the road ahead of the vehicle.

According to an example embodiment, the method may further comprise determining a maximum brake force obtainable by the electric machine based on the estimated road friction between the tire surface of the at least one wheel and the road surface operable by the vehicle, and the determined vertical wheel force of the at least one wheel; determining a maximum allowable inclination of the road surface based on the maximum brake force obtainable by the electric machine; and transmitting the signal indicative of a foundation braking interaction when an inclination of the road surface is higher than the maximum allowable inclination of the road.

An advantage is that the operator of the vehicle can be provided with a warning also when the slope is too severe, i.e. when the electric machine is unable to reduce the speed based on the slope inclination. This may be used in conjunction with the lateral force approach described above when the slope is inclined at the same time as being curved. When driving downhill and straight ahead, i.e. at a downhill road path without any curvature(s), the lateral force is substantially zero, whereby the signal indicative of foundation braking interaction can be solely based on the slope inclination exceeding the maximum allowable slope inclination.

According to an example embodiment, the method may further comprise detecting the inclination of the road surface ahead of the vehicle; and transmitting a pre-warning signal indicative of foundation braking interaction to the operator of the vehicle at a predetermined distance from the road surface ahead of the vehicle when the inclination of the road surface ahead of the vehicle is higher than the maximum allowable inclination.

Hereby, the operator can, before arriving at the downhill slope, prepare to apply the foundation brakes. Hence, a brake blending action can be obtained when both the electric machine as well as the foundation brakes are operated to reduce the vehicle speed.

According to a second aspect, there is provided a vehicle motion management system for a heavy-duty vehicle, the vehicle motion management system being connectable to an actuator control system configured to control an electric machine to apply a propulsion torque on at least one wheel of the vehicle upon applying a pressure on an accelerator pedal of the vehicle, and to apply a brake torque on the at least one wheel upon releasing the pressure from the accelerator pedal, the vehicle motion management system comprising control circuitry configured to receive a signal indicative of a lateral force on the at least one wheel of the vehicle; determine a maximum allowable lateral force of the at least one wheel for obtaining a desired longitudinal brake force by the electric machine when releasing the pressure from the accelerator pedal, the maximum allowable lateral force being based on a determined vertical wheel force of the at least one wheel, an estimated road friction between a tire surface of the at least one wheel and a road surface operable by the vehicle, and a detected inclination of the road surface; and transmit a signal indicative of a foundation braking interaction to an operator of the vehicle when the lateral force is higher than the maximum allowable lateral force.

Effects and features of the second aspect are largely analogous to those described above in relation to the first aspect.

According to a third aspect, there is provided a vehicle comprising a vehicle motion management system according to the above described second aspect.

According to a fourth aspect, there is provided a computer program comprising program code means for performing the steps of any one of the above-described embodiments in relation to the first aspect when the program is run on a computer.

According to a fifth aspect, there is provided a computer readable medium carrying a computer program comprising program means for performing the steps of any one of the above-described embodiments in relation to the first aspect when the program means is run on a computer.

Effects and features of the third, fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
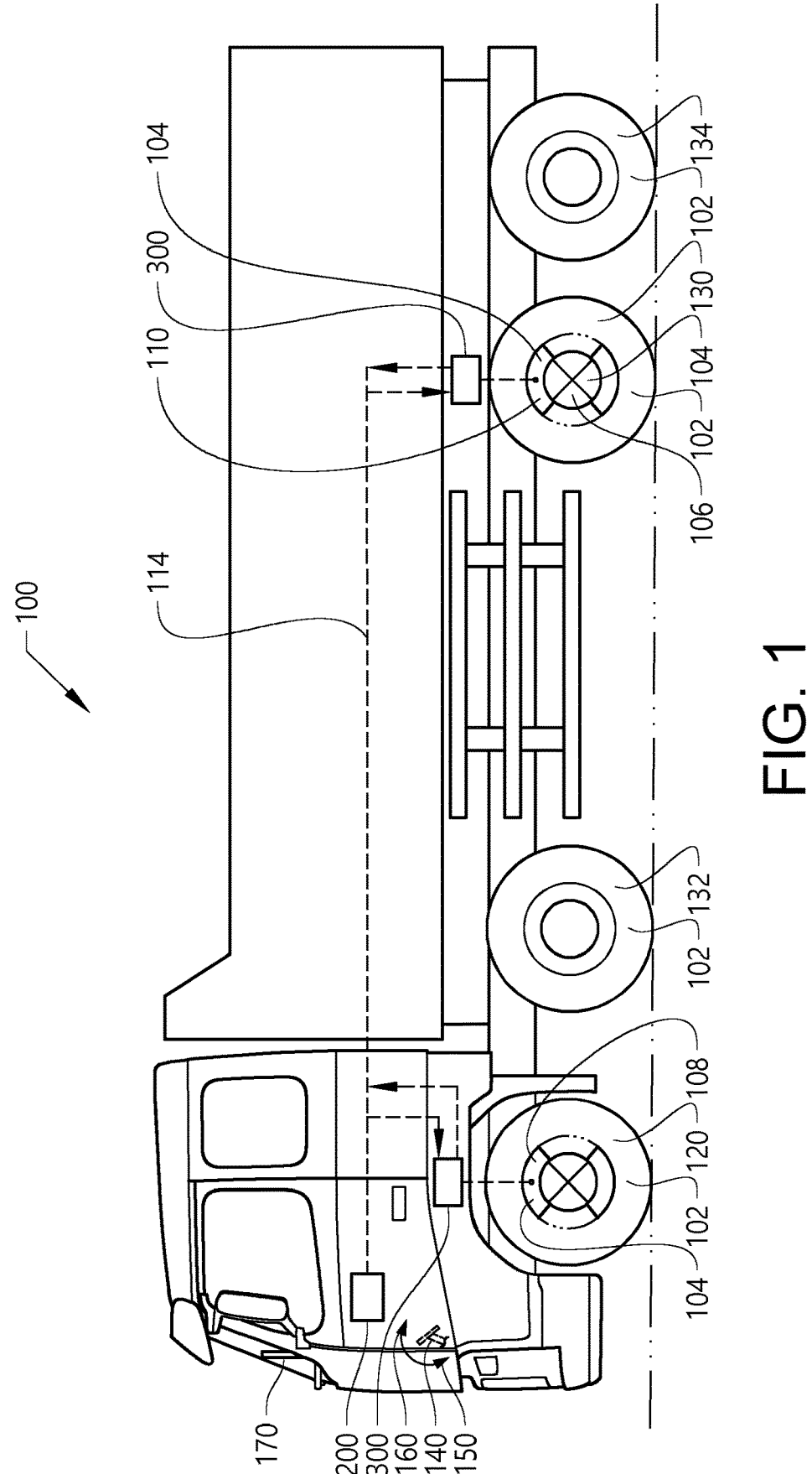
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 100 in the form of a truck. The vehicle comprises a plurality of wheels 102. In particular, the vehicle 100 comprises a pair of front wheels 120 also referred to as the first (120' in FIG. 2) and second (120" in FIG. 2) wheels, a pair of rear wheels 130 also referred to as the third (130' in FIG. 2) and fourth (130" in FIG. 2) wheels. The exemplified vehicle 100 also comprises a pair of wheels 132 arranged between the pair of front wheels 120 and the pair of rear wheels 130, as well as a pair of wheels 134 arranged behind the pair of rear wheels 130. The following description will focus on describing the invention in relation to the actuators of the pair of front wheels 120 and the pair of rear wheels 130, although the invention is applicable for actuators of the other wheels as well.

As exemplified in FIG. 1, the pair of front wheels 120 and the pair of rear wheels 130 each comprises at least one actuator 104. In particular, the first and second wheels of the pair of front wheels 120 each comprises actuators 104 in the form of a first and a second foundation brake, of which only the first foundation brake 108 is illustrated. The second and third wheels of the pair of rear wheels 130 each comprises actuators 104 in the form of a third and a fourth foundation brake, of which only the third foundation brake 110 is illustrated. The vehicle 100 also comprises an actuator 104 in the form of an electric machine 106 operably connected to the pair of rear wheels 130. The electric machine 106 is configured to apply a propulsion torque on the pair of rear wheels upon applying a pressure, indicated with arrow 150, on an accelerator pedal 140 of the vehicle 100, and to apply a brake torque on the pair of rear wheels 130 upon releasing the pressure, indicated with arrow 160, from the accelerator pedal 140. The vehicle 100 is thus provided with a so-called one pedal speed control in which both propulsion and braking can be controlled by the actuating motion of the accelerator pedal 140. Although not depicted in FIG. 1, the vehicle 100 also comprises a brake pedal which is operatively connected to the foundation brakes. As will be evident below with reference to the description of FIG. 2, the electric machine 106 is exemplified as connected to the pair of rear wheels 130, i.e. the third 130' and fourth 130" wheels via a differential coupling, i.e. a single electric machine 106 is used for propelling and braking the pair of rear wheels 130. However, the invention is also applicable by the use of so-called wheel hub motors, wherein each one of the third and fourth wheels is provided with an individual electric machine for controlling propulsion and braking.

The electric machine 106 is thus arranged to e.g. provide a tire force to the wheel(s) of the vehicle 100. The electric machine 106 may thus be adapted to generate a propulsion torque as well as arranged in a regenerative braking mode for electrically charging a battery (not shown) or other energy storage system(s) of the vehicle 100. Electric machines may also generate braking torque without storing energy. For instance, brake resistors and the like may be used to dissipate the excess energy from the electric machines during braking.

Moreover, each of the actuators 104 is connected to a respective motion support system 300 arranged for controlling operation of the actuator 104. The motion support system 300 is preferably a decentralized motion support system 300, although centralized implementations are also possible. It is furthermore appreciated that some parts of the motion support system may be implemented with processing circuitry remote from the vehicle, such as on a remote server accessible from the vehicle via wireless link. Still further, each motion support system 300 is connected to a vehicle motion management system 200 of the vehicle 100 via a data bus communication arrangement 114 or the like. Hereby, control signals can be transmitted between the vehicle motion management system 200 and the motion support system 300. Portions of the vehicle motion management system 200 will be described in further detail below with reference to FIG. 3.

The vehicle 100 optionally comprises a wireless communications transceiver arranged to establish a radio link to a wireless network comprising a remote server. This way the control unit may access the remote servers for uploading and downloading data. Notably, the vehicle 100 may store measurement data such as amounts of regenerated energy by the electric machines 106 at various geographical locations an along different vehicle routes in local memory or at the remote server. The vehicle motion management system 200 may also query the remote server for information about previously experienced amounts of regenerated energy, and/or temperature increases in various vehicle components along a given route.

The vehicle motion management system 200 may furthermore be arranged to obtain data indicative of an expected rolling resistance for a given route, either from manual configuration or remotely from the remote server. The rolling resistance of the vehicle 100 will affect the energy consumption of the vehicle as it traverses a route. For instance, a gravel road is likely to require more energy compared to a smoother asphalt freeway. Also, friction and air resistance will reduce the requirements on generating negative torque during downhill driving.

The vehicle motion management system 200 as well as the motion support system 300 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device. As depicted in FIG. 1, the vehicle 100 also comprises a human machine interface 170, illustrated in the form of a heads-up display. The vehicle motion management system 200 may thus transmit signals recognisable by an operator of the vehicle 100, whereby the operator can take suitable actions based on the signal received.

Figure 2:
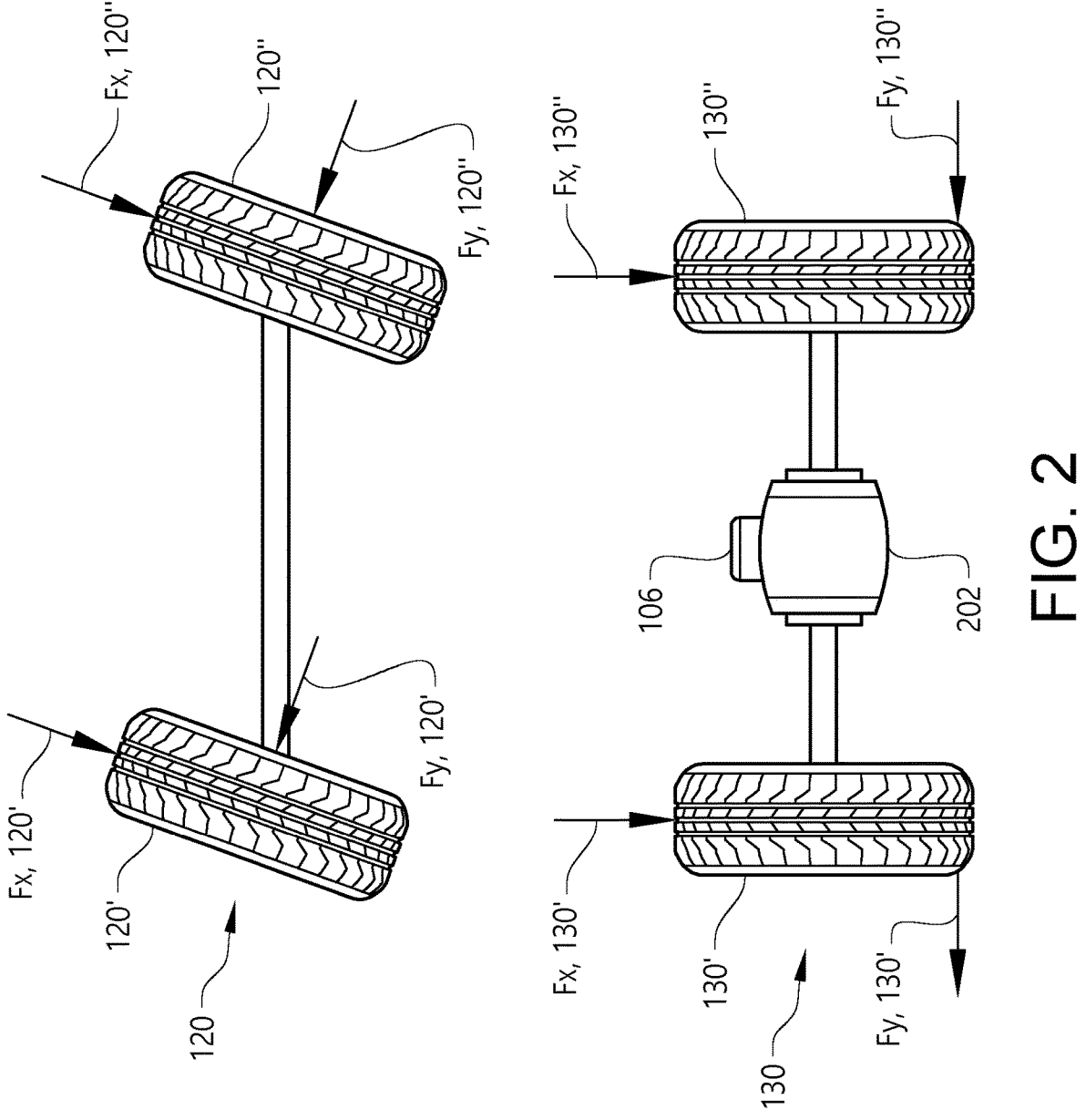
FIG. 2 is a schematic illustration of a pair of front wheels and a pair of rear wheels of the FIG. 1 vehicle according to an example embodiment.
Figure 3:
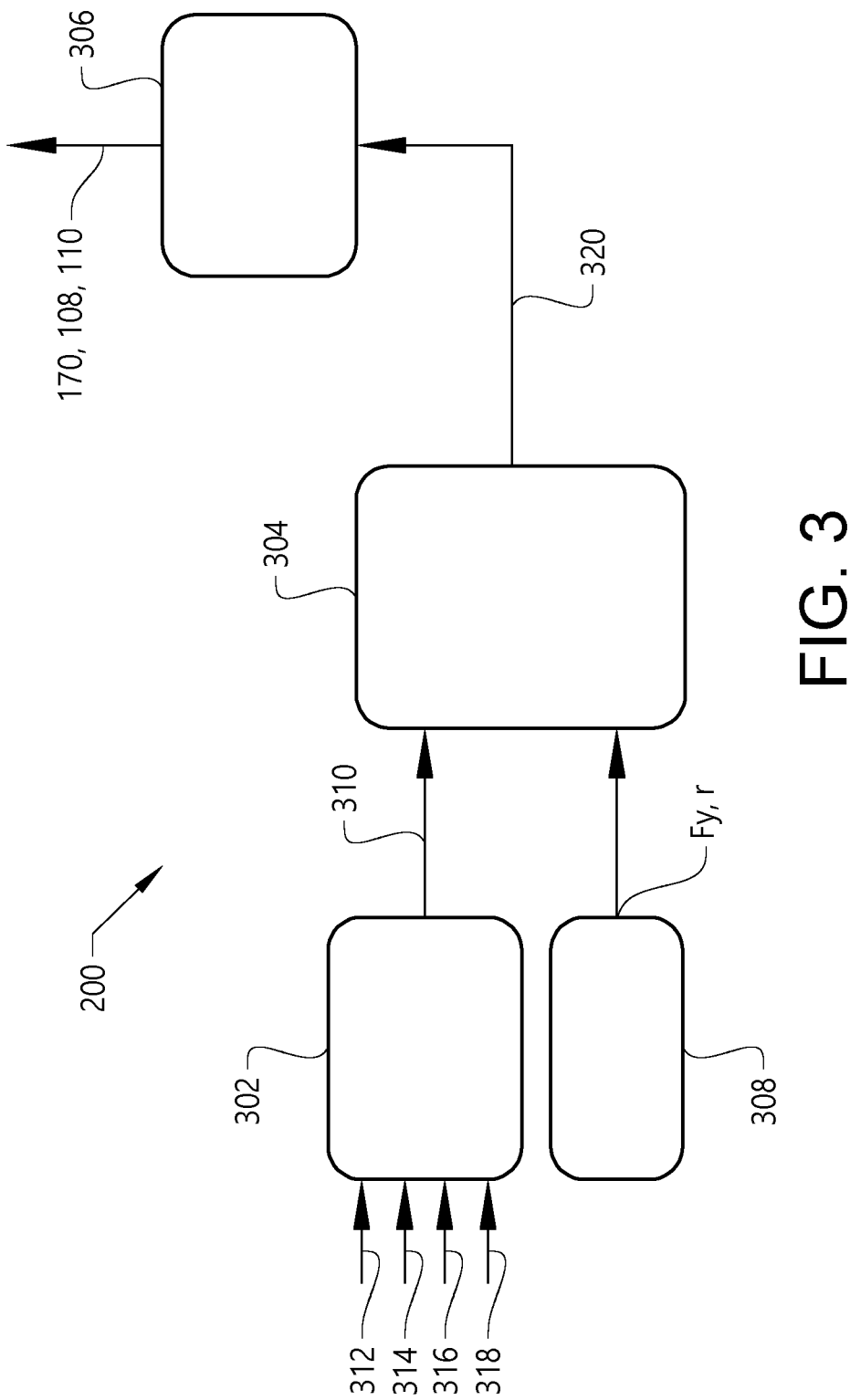
FIG. 3 is a schematic illustration of a vehicle motion management system according to an example embodiment.

As indicated above, the vehicle motion management system 200 is configured to transmit control signals to the motion support systems 300. In further detail, a control allocator of the vehicle motion management system 200 determines a brake torque level to be applied by the various actuators 104 based on a torque request received by the vehicle motion management system 200 in order to obtain a desired braking action by the vehicle 100. To regenerate as much electric power as possible during braking, it is desirable to reduce the vehicle speed mainly by means of the electric machine. However, there are situations when the electric machine may not be able to solely apply the desired brake torque. Reference is therefore now made to FIGS. 2-3 for describing the braking action and the operation of the vehicle motion management system 200 during braking.

Starting with FIG. 2 which is a schematic illustration of the pair of front wheels 120 and the pair of rear wheels 130 of the FIG. 1 vehicle according to an example embodiment. In particular, FIG. 2 schematically illustrates forces exposed to the wheels of the vehicle 100 during braking when the vehicle is turning.

As described above, the vehicle comprises an electric machine 106, which is operatively connected to the rear pair of wheels 130 via a differential coupling 202. The following will describe the driving situation when the operator releases the pressure 160 from the accelerator pedal 140 to reduce the vehicle speed by regenerating electric power using the electric machine 106. As can be seen, the pair of front wheels 120 are exposed to longitudinal and lateral forces during braking. In particular, each of the first and second wheels is exposed to a respective longitudinal wheel force $F_{x,120'}$, $F_{x,120''}$ and a respective lateral wheel force $F_{y,120'}$, $F_{y,120'''}$. In a similar manner, the rear pair of wheels 130 are exposed to longitudinal and lateral forces during braking. In particular, each of the third and fourth wheels is exposed to a respective longitudinal wheel force $F_{x,130'}$, $F_{x,130''}$ and a respective lateral wheel force $F_{y,130'}$, $F_{y,130''}$. The sum of the longitudinal wheel forces, i.e. $F_{x,130'}+F_{x,130''}$ will in the following be referred to as $F_{x,r}$ and the sum of the lateral wheel forces, i.e. $F_{y,130'}+F_{y,130''}$ will in the following be referred to as $F_{y,r}$. When the pair of rear wheels 130 are exposed to a lateral wheel force, this will affect the level of longitudinal wheel force available during braking. In particular, the lateral force component will consume the available friction between the tire surface of the wheels and the road surface. Hence, a higher lateral wheel force results in a lower longitudinal wheel force available for braking. When the vehicle 100 is braking and driving straight ahead, the lateral wheel forces $F_{y,r}$ may be seen as neglectable, especially when the road path is not laterally inclined.

Figure 5:
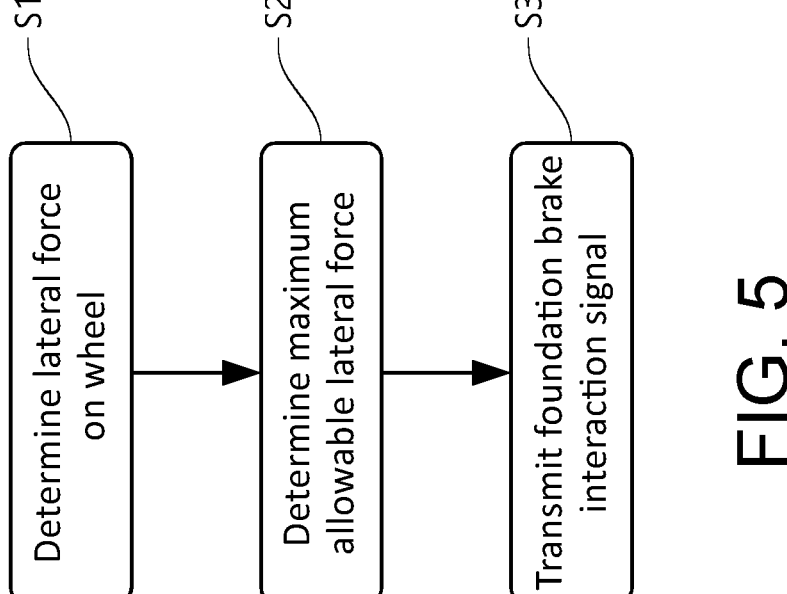
FIG. 5 is a flow chart of a method for determining actuator brake torque limits according to an example embodiment.

As indicated above, there are driving situations when the longitudinal brake force from the electric machine 106 is not sufficient to solely reduce the vehicle speed as desired, and the foundation brake(s) 108, 110 need to intervene to reduce the risk of accelerating the vehicle 100 when deceleration is desired. The following will describe the operation of the vehicle motion management system 200 during such situations with reference to FIG. 3 in combination with FIG. 5. Since the electric machine is exemplified as connected to the pair of rear wheels 130, only the forces acting on the pair of rear wheels 130 will be described.

As depicted in FIG. 2, the vehicle motion management system 200 comprises a lateral force capability module 302, a comparator module 304 and a foundation brake interaction module 306 and a lateral force determination module 308.

During operation, the lateral force determination module 308 determines S1 a lateral force $F_{y,130'}$, $F_{y,130'}$ on the respective wheels of the pair of rear wheels. For the exemplified vehicle 100 using a single electric machine 106, a lateral force $F_{y,r}$ acting on the pair of rear wheels is determined. The lateral force $F_{y,r}$ acting on the pair of rear wheels 130 can be a current lateral force exposed to the pair of rear wheels 130, or an estimated lateral force exposed to the pair of rear wheels 130 at an upcoming point in time. In the latter case, the estimated lateral force at the upcoming point in time can be based on e.g. GPS data in combination with estimated road condition at the road path ahead. Further, the lateral force can preferably, although not exclusively, be based on a mapping model defining a relationship between wheel slip and lateral wheel force, which will be described in further detail below with reference to the description of FIG. 4. The lateral force determination module 308 transmits the lateral force $F_{y,r}$ determined to the comparator module 304.

The lateral force capability module 302 is configured to determine S2 a maximum allowable lateral force 310 of the at least one wheel, or as exemplified, for the pair of rear wheels 130. The maximum allowable lateral force, also referred to below as $F_{y,\ max}$ is an indicator of how much lateral force is allowable for the pair of rear wheels 130 for obtaining a desired longitudinal brake force by the electric machine 106 when releasing the pressure from the accelerator pedal 140.

In order to determine the maximum allowable lateral force 310, the lateral force capability module 302 receives a signal indicative of a vertical force 312 acting on a wheel axle connected to the pair of rear wheels 130, an estimated road friction 314 between a tire surface of the at wheels 130 and a road surface operable by the vehicle, and a detected inclination 316 of the road surface. The road friction 314 between the tire surface of the wheel and the road surface can be determined by e.g. a camera and a measured temperature, while the inclination 316 can be detected using a sensor, etc. As a conceivable option, the lateral force capability module 302 may also receive a signal indicative of a total mass 318 of the vehicle 100.

In order to determine the maximum allowable lateral force 310, the lateral force capability module 302 firstly determines the braking force $F_b$ needed to maintain the vehicle speed according to eq. (1) below.

$$F_b = m_{tot} g\ s \qquad (1)$$

Where:
s=slope in percentage, and
$m_{tot}$ g=the gravitational force.
Further, the road friction 314 between the tire surface of the wheels and the road surface sets a limit on the possible force applied on the wheels according to eq. (2) below.

$$\mu F_{z,r} \le \sqrt{F_{y,r}^2 + F_{x,r}^2} \qquad (2)$$

Where $F_{z,r}$ is the vertical force 312 received by the lateral force capability module 302. From eq. (2), the lateral force $F_{y,r}$ that can be applied on the pair of rear wheels can be calculated by setting $F_{x,r}=F_b$, thereby forming eq. (3) below.

$$F_{y,r} \le \sqrt{(\mu F_{z,r})^2 - F_b^2} \qquad (3)$$

10

Where μ is the road friction 314. The maximum lateral force $F_{y,r,max}$, i.e. the maximum allowable lateral force 310 can then be determined according to eq. (4).

$$F_{y,r,max} = \sqrt{(\mu F_{z,r})^2 - F_b^2} \qquad (4)$$

Hereby, the lateral force capability module 302 can determine the maximum allowable lateral force 310 and transmit a signal thereof to the comparator module 304.

The comparator module 304 compares the lateral force $F_{y,r}$ determined by the lateral force determination module 308 with the maximum allowable lateral force 310 determined by the lateral force capability module 302. If the lateral force $F_{y,r}$ determined by the lateral force determination module 308 is higher than the maximum allowable lateral force 310 determined by the lateral force capability module 302, the electric machine 106 will not be able to sufficiently reduce the vehicle speed when the pressure is released from the accelerator pedal 140. In such a situation, the comparator module 304 transmits S3 a signal to the foundation brake interaction module 306, which signal is indicative of a foundation brake interaction 320, i.e. a need to also apply the foundation brakes of the vehicle. The signal is received by the operator of the vehicle 100, either via the above-described human machine interface 170, or via a brake system of the vehicle 100. In the latter case, the operator receives the signal by determining that at least one of the foundation brakes 108, 110 is controlled to apply a brake torque.

The comparator module 304, or other module of the vehicle motion management system 200 may also be configured to determine a maximum allowable inclination of the road surface for braking the vehicle using the electric machine 106. In particular, the braking force $F_b$ needed to maintain the vehicle speed is described above in eq. (1).

The maximum force $F_{em,\ max}$ that the electric machine 106 can generate due to the road friction 314 can be determined according to eq. (5) below.

$$F_{em,max} = 2\ \mu\ min(F_{z,r}) \qquad (5)$$

By merging eq. (1) with eq. (5), the maximum allowable slope angle, in percentage, can be found according to eq. (6).

$$s_{max} = 2\ \mu \frac{min(F_{z,r})}{m_{tot} g} \qquad (6)$$

The maximum allowable slope angle can hereby be compared to the slope angle currently operated by the vehicle 100. If the current slope angle is higher than the maximum allowable slope angle, the signal indicative of foundation braking interaction can be transmitted to the operator of the vehicle 100 in a similar manner as described above.

As indicated above, the road surface may be a detected road surface ahead of the vehicle. By detecting the road surface ahead of the vehicle, a pre-warning signal indicative of foundation braking interaction can be transmitted to the operator before the vehicle arrives at the steep slope. Hence, the pre-warning signal can be transmitted at a predetermined distance from the road surface ahead of the vehicle when the inclination of the road surface ahead of the vehicle is higher than the maximum allowable inclination.

Figure 4:
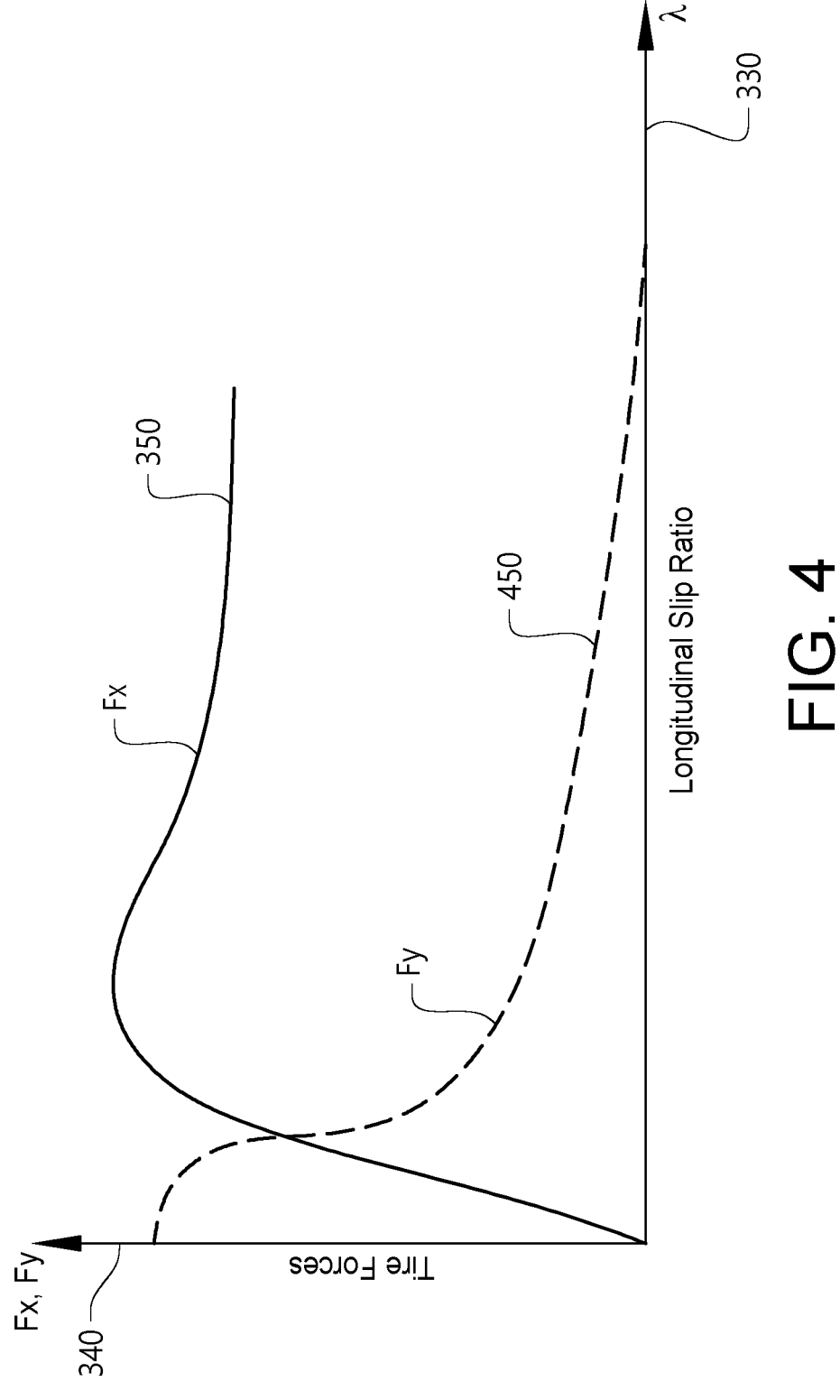
FIG. 4 is a graph illustrating an example embodiment of a model representing a relationship between wheel slip and lateral wheel forces.

Reference is now made to FIG. 4 which is a graph illustrating an example embodiment of a model representing a relationship between wheel slip and lateral wheel forces. Accordingly, the model depicted in FIG. 4 can be used for estimating the above-described lateral wheel force 216.

As can be seen, FIG. 4 illustrates a model 350 representing the relationship between the calculated longitudinal wheel slip and the estimated longitudinal wheel force values, while the model 450 represents the relationship between the maximum available lateral wheel forces for a given longitudinal wheel slip. The model 450 can also, for a predetermined lateral slip angle of the tire, represent the achieved lateral wheel force for a given longitudinal wheel slip. The vertical axis 340 represents the tire force generated between the surface supporting the wheel 102 and the wheel, while the horizontal axis 330 represents the longitudinal wheel slip of the wheel 102 according to eq. (7):

$$\lambda = \frac{\omega_w R_w - V_{x,w}}{\max(|\omega_w R_w|, |V_{x,w}|)} \qquad (7)$$

Where:
$\lambda$ is the wheel slip for the wheel;
$\omega_w$ is the rotational velocity of the wheel;
$R_w$ is the wheel radius; and
$V_{x,w}$ is the longitudinal wheel speed of the wheel.

The lateral force acting on the wheel can hereby be determined by calculating the wheel slip and using the model in FIG. 4.

It is to be understood that the present disclosure is not limited to the embodiments described above and illustrated in the drawings; rather, the skilled person will recognize that many changes and modifications may be made within the scope of the appended claims.

The invention claimed is:

1. A method of controlling a heavy-duty vehicle, the vehicle comprising an electric machine configured to apply a propulsion torque on at least one wheel of the vehicle upon applying a pressure on an accelerator pedal of the vehicle, and to apply a brake torque on the at least one wheel upon releasing the pressure from the accelerator pedal, and at least one foundation brake controlled by a brake system of the vehicle, the method comprising:

determining a lateral force on the at least one wheel of the vehicle when operating the vehicle at a curvature road path;

determining a maximum allowable lateral force of the at least one wheel for obtaining a desired longitudinal brake force by the electric machine when releasing the pressure from the accelerator pedal, the maximum allowable lateral force being based on a determined vertical wheel force of the at least one wheel, an estimated road friction between a tire surface of the at least one wheel and a road surface operable by the vehicle, and a sensor detected slope inclination of the road surface; and transmitting a signal indicative of a foundation braking interaction to an operator of the vehicle when the lateral force is higher than the maximum allowable lateral force, the signal being received east one of a human machine interface of the vehicle and the brake system for controlling the at least one foundation brake to apply a brake torque.

2. The method of claim 1, further comprising:
determining a wheel slip value for the at least one wheel; and
determining the lateral force exposed to the at least one wheel based on a mapping model defining a relationship between wheel slip and lateral wheel force.

3. The method of claim 1, wherein the lateral force is a current lateral force exposed to the at least one wheel of the vehicle.

4. The method of claim 1, wherein the maximum allowable lateral force is further based on a total mass of the vehicle.

5. The method of claim 1, wherein the electric machine is operable to apply a brake torque on a pair of rear wheels of the vehicle.

6. The method of claim 5, wherein the electric machine is connected to the pair of rear wheels via differential coupling.

7. The method of claim 1, wherein the road surface is a road surface currently operated by the vehicle.

8. The method of claim 1, wherein the road surface is a detected road surface ahead of the vehicle.

9. The method of claim 1, further comprising:
determining a maximum brake force obtainable by the electric machine based on the estimated road friction between the tire surface of the at least one wheel and the road surface operable by the vehicle, and the determined vertical wheel force of the at least one wheel;
determining a maximum allowable inclination of the road surface based on the maximum brake force obtainable by the electric machine; and
transmitting the signal indicative of a foundation braking interaction when an inclination of the road surface is higher than the maximum allowable inclination of the road.

10. The method of claim 9:
wherein the road surface is a detected road surface ahead of the vehicle; and
further comprising:
detecting the inclination of the road surface ahead of the vehicle; and
transmitting a pre-warning signal indicative of foundation braking interaction to the operator of the vehicle at a predetermined distance from the road surface ahead of the vehicle when the inclination of the road surface ahead of the vehicle is higher than the maximum allowable inclination.

11. The method of claim 1, wherein the signal indicative of the foundation braking interaction is transmitted to a human machine interface (HMI) of the vehicle.

12. A computer program comprising program code means for performing the steps of claim 1 when the program is run on a computer.

13. A computer readable medium carrying a computer program comprising program means for performing the steps of claim 1 when the program means is run on a computer.

14. A vehicle motion management system for a heavy-duty vehicle, the vehicle motion management system being connectable to an actuator control system configured to control an electric machine to apply a propulsion torque on at least one wheel of the vehicle upon applying a pressure on an accelerator pedal of the vehicle, and to apply a brake torque on the at least one wheel upon releasing the pressure from the accelerator pedal, the vehicle motion management system being further configured to control a brake system arranged to control at least one foundation brake of the vehicle, the vehicle motion management system comprising control circuitry configured to:

receive a signal indicative of a lateral force on the at least one wheel of the vehicle when operating the vehicle at a curvature road path;

determine a maximum allowable lateral force of the at least one wheel for obtaining a desired longitudinal brake force by the electric machine when releasing the pressure from the accelerator pedal, the maximum allowable lateral force being based on a determined vertical wheel force of the at least one wheel, an estimated road friction between a tire surface of the at least one wheel and a road surface operable by the vehicle, and a sensor detected slope inclination of the road surface; and transmit a signal indicative of a foundation braking interaction to an operator of the vehicle when the lateral force is higher than the maximum allowable lateral force, the signal being received by at least one of a human machine interface of the vehicle and the brake system for controlling the at least one foundation brake to apply a brake torque.

15. A vehicle comprising the vehicle motion management system of claim 14.

* * * * *